United States Patent [19]
Biesmans et al.

[11] Patent Number: 5,942,553
[45] Date of Patent: Aug. 24, 1999

[54] ORGANIC AEROGELS

[75] Inventors: Guy Leon Biesmans, Everberg; Andy Mertens, St.-Stevens-Woluwe, both of Belgium

[73] Assignee: Imperial Chemical Industries PLC, London, United Kingdom

[21] Appl. No.: 08/952,641

[22] PCT Filed: Apr. 29, 1996

[86] PCT No.: PCT/EP96/01783

§ 371 Date: Nov. 20, 1997

§ 102(e) Date: Nov. 20, 1997

[87] PCT Pub. No.: WO96/37539

PCT Pub. Date: Nov. 28, 1996

[30] Foreign Application Priority Data

May 22, 1995 [EP] European Pat. Off. ............. 95201333

[51] Int. Cl.$^6$ .................................. C08J 9/12; C08J 9/14
[52] U.S. Cl. ............................. 521/99; 252/62; 521/128; 521/129; 521/130; 521/155
[58] Field of Search .................... 252/315.1, 62; 521/159, 920, 63, 64, 99, 130, 128, 129, 155; 528/53, 48, 902; 516/102

[56] References Cited

U.S. PATENT DOCUMENTS

| | | | |
|---|---|---|---|
| 3,574,150 | 4/1971 | Jefferson et al. | 521/63 |
| 3,894,979 | 7/1975 | Samples | 528/48 X |
| 4,363,738 | 12/1982 | Kummermehr | 252/62 |
| 4,596,835 | 6/1986 | Werner et al. | 528/53 X |
| 4,795,763 | 1/1989 | Gluck et al. | 521/99 |
| 5,192,607 | 3/1993 | Soukup | 521/99 X |
| 5,260,344 | 11/1993 | Aishida et al. | 521/131 |
| 5,306,555 | 4/1994 | Ramamurthi et al. | 252/315.1 X |
| 5,484,818 | 1/1996 | De Vos et al. | 521/128 X |
| 5,571,623 | 11/1996 | Kuriyama et al. | 528/53 X |
| 5,869,545 | 2/1999 | Biesmans et al. | 521/130 X |

FOREIGN PATENT DOCUMENTS

| | | |
|---|---|---|
| 95 02009 | 1/1995 | WIPO . |
| 95 03358 | 2/1995 | WIPO . |

*Primary Examiner*—Richard D. Lovering

[57] ABSTRACT

The disclosed invention relates to polyisocyanate based aerogels and their method of preparation. The aerogels are produced by mixing an organic polyisocyanate, carbon black and catalyst in a solvent. The invention advantageously enables preparation of filled polyisocyanate based organic aerogels of lower density than aerogels which do not include a filler.

11 Claims, No Drawings

ORGANIC AEROGELS

This application is a 371 of PCT/EP96/01183 filed Apr. 29, 1996.

The present invention relates to polyisocyanate based aerogels and to methods for their preparation.

Aerogels are a unique class of ultrafine cell size, low density, open-celled foams. Aerogels have continuous porosity and their microstructure with pore sizes below the free mean path of air (pore sizes in the nanometer range) is responsible for their unusual thermal properties.

Organic aerogels based on polyisocyanate chemistry are described in WO 95/03358.

They are prepared by mixing a polyisocyanate and a trimerisation catalyst and optionally a polyfunctional isocyanate-reactive compound in a suitable solvent and maintaining said mixture in a quiescent state for a sufficiently long period of time to form a polymeric gel. The gel so formed is then supercritically dried.

During the drying the gel shrinks substantially leading to an increase in density of the obtained aerogel.

Therefore it is an object of the present invention to provide a method for preparing polyisocyanate-based organic aerogels of lower density.

Accordingly, the present invention provides a method for preparing a polyisocyanate based organic aerogel comprising the steps of a) mixing an organic polyisocyanate and an isocyanate trimerisation catalyst and optionally a polyfunctional isocyanate-reactive compound in a suitable solvent, b) maintaining said mixture in a quiescent state for a sufficiently long period of time to form a polymeric gel, and c) supercritically drying the obtained gel, wherein a filler is mixed with the other ingredients in step a).

The filler used in the process of the present invention is a particulate or fibrous, organic or inorganic material.

Particle sizes of the filler are generally in the range 0.01 to 10 $\mu$m, preferably in the range 0.01 to 1 $\mu$m and most preferably in the range 0.01 to 0.1 $\mu$m.

Examples of suitable fillers to be used in the process of the present invention include talc, carbon black, titanium dioxide, metal flakes, sodium tetraborate, iron oxides, aluminum hydroxide, zinc chloride, magnesium chloride, calcium chloride, ammonium salts, potassium metaphosphate, sulfate salts, carbonates, silicates, silica, clays, polyacrylonitrile beads, polymethylmethacrylate beads, polyvinylchloride beads, polyethylene beads, polycarbonate beads, polyurethane beads, urea beads.

In a preferred embodiment of the present invention the filler used is an infrared absorbing compound, i.e. a compound absorbing (for at least 50%, preferably 75% and most preferably 90%) electromagnetic radiation in the wavelength range $10^{-3}$ to $10^{-6}$ m, especially 2 to 50 $\mu$m, more especially 5 to 40 $\mu$m and most especially 6 to 20 $\mu$m. In this case not only density but also thermal insulation properties of the obtained aerogel are improved.

A preferred filler to be used in the process of the present invention is carbon black. The carbon black may be any of the different kinds available such as lampblack, channel black, gas furnace black, oil furnace black, thermal black and graphitic carbon black. Suitable carbon blacks include furnace black SB250, furnace black SB550 and channel black SB4 (available from Degussa or Cabot).

In the process of the present invention one of such fillers may be used or two or more different fillers may be used.

Typically the amount of the filler used in the process of the present invention ranges from 0.1 to 30%, preferably from 0.5 to 20%, most preferably from 1 to 15% by weight based on the polyisocyanate component.

The filler is usually first dispersed in one of the reaction ingredients such as the polyisocyanate. There may be added compounds which help to disperse the filler or the filler may be surface-treated in order to improve the dispersing.

Aerogels prepared according to the process of the present invention have a lower density (due to a decrease in shrinkage) than those prepared in the absence of a filler.

Densities of the obtained aerogels are generally in the range 1 to 1000 kg/m$^3$, more generally in the range 10 to 800 kg/m$^3$ and even more generally in the range 20 to 400 kg/m$^3$ or even 30 to 300 kg/m$^3$ or even 90 to 200 kg/m$^3$.

The aerogels prepared according to the process of the present invention generally have pore sizes in the range 1 to 100 nm, more generally in the range 5 to 50 nm and even more generally in the range 5 to 25 nm.

Surface areas of the aerogels prepared according to the process of the present invention are generally in the range 10 to 1500 m$^2$/g, more generally in the range 50 to 1200 m$^2$/g and even more generally in the range 100 to 1000 m$^2$/g or even 150 to 1000 m$^2$/g.

Polyisocyanates for use in the present method for preparing the polyisocyanate-based aerogels include aliphatic, cycloaliphatic, araliphatic and aromatic polyisocyanates known in the literature for use generally in the production of polyurethane/polyisocyanurate materials. Of particular importance are aromatic polyisocyanates such as tolylene and diphenylmethane diisocyanate in the well known pure, modified and crude forms, in particular diphenylmethane diisocyanate (MDI) in the form of its 2,4'-, 2,2'- and 4,4'-isomers (pure MDI) and mixtures thereof known in the art as "crude" or polymeric MDI (polymethylene polyphenylene polyisocyanates) having an isocyanate functionality of greater than 2 and the so-called MDI variants (MDI modified by the introduction of urethane, allophanate, urea, biuret, carbodiimide, uretonimine or isocyanurate residues).

Further suitable polyisocyanates include fluorinated polyisocyanates as described in PCT Patent Application No. EP96/00340, incorporated herein by reference.

The polyisocyanate is used in amounts ranging from 0.5 to 30% by weight, preferably from 2 to 20% by weight and more preferably from 3 to 10% by weight based on the total reaction mixture.

Trimerisation catalysts for use in the present preparation method include any isocyanate trimerisation catalyst known in the art such as quaternary ammonium hydroxides and salts, alkali metal and alkaline earth metal hydroxides, alkoxides and carboxylates, for example potassium acetate and potassium 2-ethylhexoate, certain tertiary amines and non-basic metal carboxylates, for example lead octoate, and symmetrical triazine derivatives. Especially the triazine derivatives are preferred. Specific preferred trimerisation catalysts for use in the present method are Polycat 41 available from Abbott Laboratories, and DABCO TMR, TMR-2 and TMR-4 available from Air Products.

The polyisocyanate/catalyst weight ratio varies between 5 and 1000. The preferred polyisocyanate/catalyst weight ratio depends on the amount of polyisocyanate used, the reaction/cure temperature, the solvent used, additives used.

The preferred polyisocyanate/catalyst ratios vary between 100 and 400 for about 20 wt % polyisocyanate, between 50 and 200 for about 15 wt % polyisocyanate and between 10 and 100 (preferably between 30 and 60) for about 10 wt % polyisocyanate.

The solvent to be used in the preparation method according to the present invention should be a solvent for the monomeric (non-reacted) polyisocyanate as well as for the polymeric (reacted) polyisocyanate. The solvent power should be such as to form a homogeneous solution of nonreacted compounds and to dissolve the reaction product or at least prevent flocculation of the reaction product. Solvents with a δ Hansen solubility parameter between 10 and 35 $MPa^{1/2}$, preferably between 15 and 30 $MPa^{1/2}$, most preferably between 18 and 26 $MPa^{1/2}$ are most suitable. Further the critical pressure and critical temperature of the solvent should be as low as possible so as to simplify the critical drying step.

Suitable solvents for use in the method according to the present invention include hydrocarbons, dialkyl ethers, cyclic ethers, ketones, alkyl alkanoates, aliphatic and cycloaliphatic hydrofluorocarbons, hydrochlorofluorocarbons, chlorofluorocarbons, hydrochlorocarbons, halogenated aromatics and fluorine-containing ethers. Mixtures of such compounds can also be used.

Suitable hydrocarbon solvents include lower aliphatic or cyclic hydrocarbons such as ethane, propane, n-butane, isobutane, n-pentane, isopentane, cyclopentane, neopentane, hexane and cyclohexane.

Suitable dialkyl ethers to be used as solvent include compounds having from 2 to 6 carbon atoms. As examples of suitable ethers there may be mentioned dimethyl ether, methyl ethyl ether, diethyl ether, methyl propyl ether, methyl isopropyl ether, ethyl propyl ether, ethyl isopropyl ether, dipropyl ether, propyl isopropyl ether, diisopropyl ether, methyl butyl ether, methyl isobutyl ether, methyl t-butyl ether, ethyl butyl ether, ethyl isobutyl ether and ethyl t-butyl ether.

Suitable cyclic ethers include tetrahydrofuran.

Suitable dialkyl ketones to be used as solvent include acetone and methyl ethyl ketone.

Suitable alkyl alkanoates which may be used as solvent include methyl formate, methyl acetate, ethyl formate and ethyl acetate.

Suitable hydrofluorocarbons which may be used as solvent include lower hydrofluoroalkanes, for example difluoromethane, 1,2-difluoroethane, 1,1,1,4,4,4-hexafluorobutane, pentafluoroethane, 1,1,1,2-tetrafluoroethane, 1,1,2,2-tetrafluoroethane, pentafluorobutane, tetrafluoropropane and pentafluoropropane.

Suitable hydrochlorofluorocarbons which may be used as solvent include chlorodifluoromethane, 1,1-dichloro-2,2,2-trifluoroethane, 1,1-dichloro-1-fluoroethane, 1-chloro-1,1-difluoroethane, 1-chloro-2-fluoroethane and 1,1,1,2-tetrafluoro-2-chloroethane.

Suitable chlorofluorocarbons which may be used as solvent include trichlorofluoromethane, dichlorodifluoromethane, trichlorotrifluoroethane and tetrafluorodichloroethane.

Suitable hydrochlorocarbons which may be used as solvent include 1- and 2-chloropropane and dichloromethane.

Suitable halogenated aromatics include monochlorobenzene and dichlorobenzene.

Suitable fluorine-containing ethers which may be used as solvent include bis-(trifluoromethyl)ether, trifluoromethyl difluoromethyl ether, methyl fluoromethyl ether, methyl trifluoromethyl ether, bis-(difluoromethyl)ether, fluoromethyl difluoromethyl ether, methyl difluoromethyl ether, bis-(fluoromethyl)ether, 2,2,2-trifluoroethyl difluoromethyl ether, pentafluoroethyl trifluoromethyl ether, pentafluoroethyl difluoromethyl ether, 1,1,2,2-tetrafluoroethyl difluoromethyl ether, 1,2,2,2-tetrafluoroethyl fluoromethyl ether, 1,2, 2-trifluoroethyl difluoromethyl ether, 1,1-difluoroethyl methyl ether, 1,1,1,3,3,3-hexafluoroprop-2-yl fluoromethyl ether.

Another suitable solvent is N-methyl pyrolidone.

Preferred solvents for use in the method according to the present invention are dichloromethane, methyl ethyl ketone, tetrahydrofuran, monochlorobenzene, trichlorofluoromethane (CFC 11), chlorodifluoromethane (HCFC 22), 1,1,1-trifluoro-2-fluoroethane (HFC 134a), 1,1-dichloro-1-fluoroethane (HCFC 141b) and mixtures thereof such as HCFC 141b/CFC 11 mixtures.

Another suitable solvent is liquid carbondioxide ($CO_2$). Liquid carbondioxide may be used under various pressures (above 63 bar) and temperatures. Also sub- or supercritical carbondioxide can be used as a solvent. The solvent power of sub- or supercritical carbondioxide can be adjusted by adding suitable modifiers such as methanol, ethanol, acetone, HCFC 22, dichloromethane in levels of 0.1 to 50% by volume.

In case liquid carbondioxide is used as solvent it has been shown to be an advantage to use as polyisocyanate in the preparation of the present aerogels a fluorinated isocyanate-ended prepolymer made from a polyisocyanate and a fluorinated isocyanate-reactive compound such as a fluorinated monol or diol.

Other suitable solvents include $C_1$–$C_8$ hydrocarbons in sub- or supercritical state. The solvent power of these sub- or supercritical $C_1$–$C_8$ hydrocarbons can be adjusted by using suitable modifiers.

The polyisocyanate, the catalyst, the solvent and the filler, optionally in the form of a dispersion are mixed by simply shaking the reaction vessel or by slowly stirring the mixture. Alternatively the polyisocyanate, the solvent and the filler, optionally in the form of a dispersion are first mixed and subsequently the catalyst is added hereto. Some catalyst may also be added after the gelling for enhancing post-cure. Mixing can be done at room temperature or at somewhat higher temperatures.

In case of low boiling solvents (boiling point below room temperature), for example HCFC 22, the solvent is added to a pressure vessel containing the polyisocyanate, the catalyst (s) and the filler under its own vapour pressure.

Thereafter the mixture is left standing for a certain period of time to form a polymeric gel. This time period varies from 1 minute to several weeks depending on the system and the targeted void size and density. Temperatures in the range of from about 20° C. to about 50° C., preferably 40 to 45° C. may be employed, a temperature of about 10° C. below the boiling point of the solvent used being preferred.

In the case of low boiling solvents such as HCFC 22 the pressure in the closed vessel is maintained at its saturated vapour pressure and the gelation reaction is carried out at higher temperatures (preferably in the range 30 to 50° C.). At these elevated reaction temperatures DABCO TMR is the preferred trimerisation catalyst.

Although the mixture gels within a few hours, it has been found to be advantageous to cure the gels for a minimum of 24 hours so as to obtain a solid gel that can be easily handled in subsequent processing. A postcure cycle at elevated temperatures can be included.

Supercritical drying of the aerogels involves placing the solvent-filled gel in a temperature-controlled pressure vessel and bringing the vessel to a pressure above the critical pressure of the solvent (for example by filling with nitrogen gas or pumping additional solvent). At that point the vessel is then heated above the critical temperature of the solvent. After a few hours the pressure is slowly released from the vessel while keeping a constant temperature. At atmospheric pressure and after a cool down period the aerogel is removed from the vessel.

Before the supercritical drying step the gel may be exchanged into a solvent more suitable for supercritical drying, for example liquid carbondioxide, possibly via an intermediate solvent such as acetone or via liquid carbondioxide containing modifiers.

Further suitable additives to be used in the process of the present invention and further suitable processing methods are described in WO 95/03358, which is incorporated herein by reference.

The aerogels of the present invention have various applications. A few examples are described hereinafter.

Aerogel particles can be blended in the polyisocyanate and/or polyol compositions for use in preparing polyurethane foams. Subsequent foaming leads to foams loaded with solid polyisocyanate-based aerogel particles which may enhance physical properties, thermal insulation properties and fire performance of the resultant foams. This concept can also be used in the preparation of other types of foam such as thermoplastic foams made via an extrusion process.

Aerogel particles can be used as thickening agents. Due to the high surface area of these aerogels liquids can be absorbed resulting in thickening (viscosity increase) of any liquid phase. This could be used to increase the viscosity of polyisocyanate and/or polyol compositions for use in the preparation of polyurethane foams. At certain loadings of aerogel particles pastes can be formed which can then be processed via extrusion technology.

Aerogel particles can be glued together using binders or adhesives. A block of material is obtained which consists mainly of aerogel.

Aerogel blocks can be made by putting aerogel particles/powders in a mould and compressing them with or without temperature increase and optionally under inert atmosphere to make a compacted aerogel block.

The aerogels of the present invention can also be used to fill the voids of an open celled foam filler material in an evacuated insulation panel. By doing so the aged thermal insulation properties of the evacuated insulation panel can be improved.

A preferred method for filling the voids of the open celled foamed material involves soaking the open celled foamed material in a solution containing the ingredients to make the aerogel and forming the aerogel in situ by the process as described above.

The present invention is illustrated but not limited by the following examples.

SUPRASEC is a trademark of Imperial Chemical Industries.

EXAMPLE 1

Carbon black (SB4 available from Degussa) was dried in a vacuum oven at 120° C. and dispersed at 5% in polyisocyanate SUPRASEC DNR (available from Imperial Chemical Industries PLC) using high shear mixing. 10 g of this dispersion was dissolved in dichloromethane (10% solids) and 0.2 g of catalyst TMR (available from Air products) was added. The mixture was stirred for 1 minute and left to form a sol-gel. The sol-gel was transferred to a pressure vessel whereupon the dichloromethane solvent was exchanged for liquid $CO_2$ at ambient temperature. The $CO_2$ filled gel was supercritically dried from $CO_2$ (T>32° C., p>73 bar). The properties of the obtained aerogel are summarised in Table 1. Thermal insulation values (lambda) were measured according to standard ISO 2581 at atmospheric pressure and at low pressure (1 mbar).

Table 1 also includes properties of an aerogel made in an analogous way but in the absence of carbon black filler.

TABLE 1

|  |  | Reference Aerogel | Invention Aerogel |
| --- | --- | --- | --- |
| shrinkage | % | 68 | 37 |
| density | kg/m$^3$ | 355 | 187 |
| surface area | m$^2$/g | 769 | 240 |
| pore size | nm | 8.9 | 25.8 |
| Lambda value at 1 mbar | mW/mK | 12.5 | 7 |
| Lambda value in air | mW/mK | 17.5 | 16 |

The above results show that shrinkage, density and thermal insulation of the obtained aerogel are improved when the aerogel is prepared in the presence of carbon black.

We claim:

1. Method for preparing a polyisocyanate-based aerogel comprising the steps of
   a) mixing an organic polyisocyanate and an isocyanate trimerisation catalyst in a suitable solvent,
   b) maintaining said mixture in a quiescent state for a sufficiently long period of time to form a polymeric gel, and
   c) supercritically drying the obtained gel, characterised in that carbon black is mixed together with the other ingredients in step a).

2. Method according to claim 1 wherein the carbon black is used in an amount ranging from 0.1 to 30% by weight based on the polyisocyanate component.

3. Method according to claim 2 wherein the carbon black is first dispersed in one of the reaction ingredients.

4. Method according to claim 1 wherein the organic polyisocyanate is diphenylmethane diisocyanate or polymethylene polyphenylene polyisocyanate.

5. Method according to claim 4 wherein the organic polyisocyanate is used in amounts ranging from 0.5 to 30% by weight based on the total reaction mixture.

6. Method according to claim 1 wherein the isocyanate trimerisation catalyst is a triazine derivative.

7. Method according to claim 6 wherein the isocyanate trimerisation catalyst is based on a quaternary ammonium salt.

8. Method according to claim 1 wherein the polyisocyanate/catalyst weight ratio is between 5 and 1000.

9. Method according to claim 9 wherein the solvent is dichloromethane.

10. Method according to claim 9 wherein the solvent is exchanged prior to supercritically drying the gel.

11. Method according to claim 10 wherein the solvent is exchanged into liquid carbondioxide.

* * * * *